Figure 1:
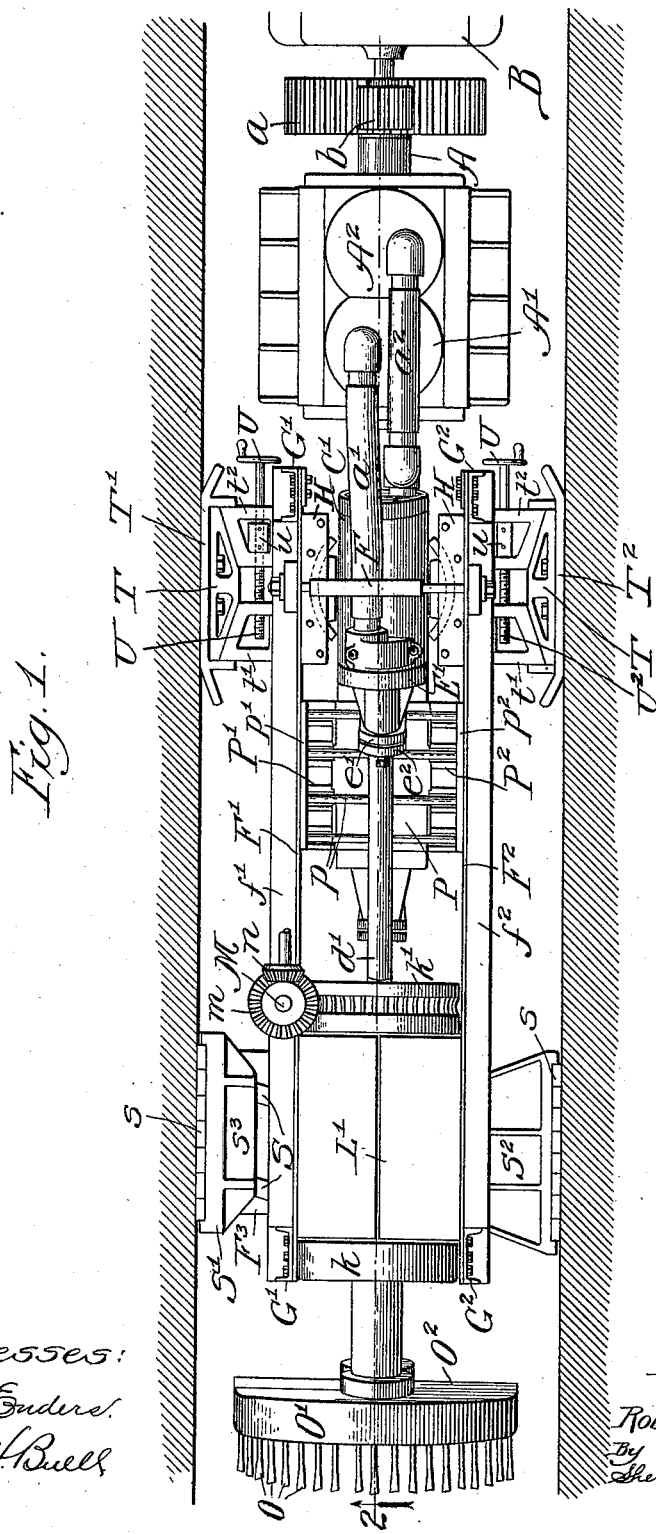

R. TEMPLE.
ROCK CUTTING APPARATUS.
APPLICATION FILED SEPT. 16, 1907.

1,001,903.

Patented Aug. 29, 1911.
5 SHEETS—SHEET 1.

Witnesses:
John Enders
Chas. H. Bull

Inventor:
Robert Temple,
By Sheridan & Wilkinson
Attys.

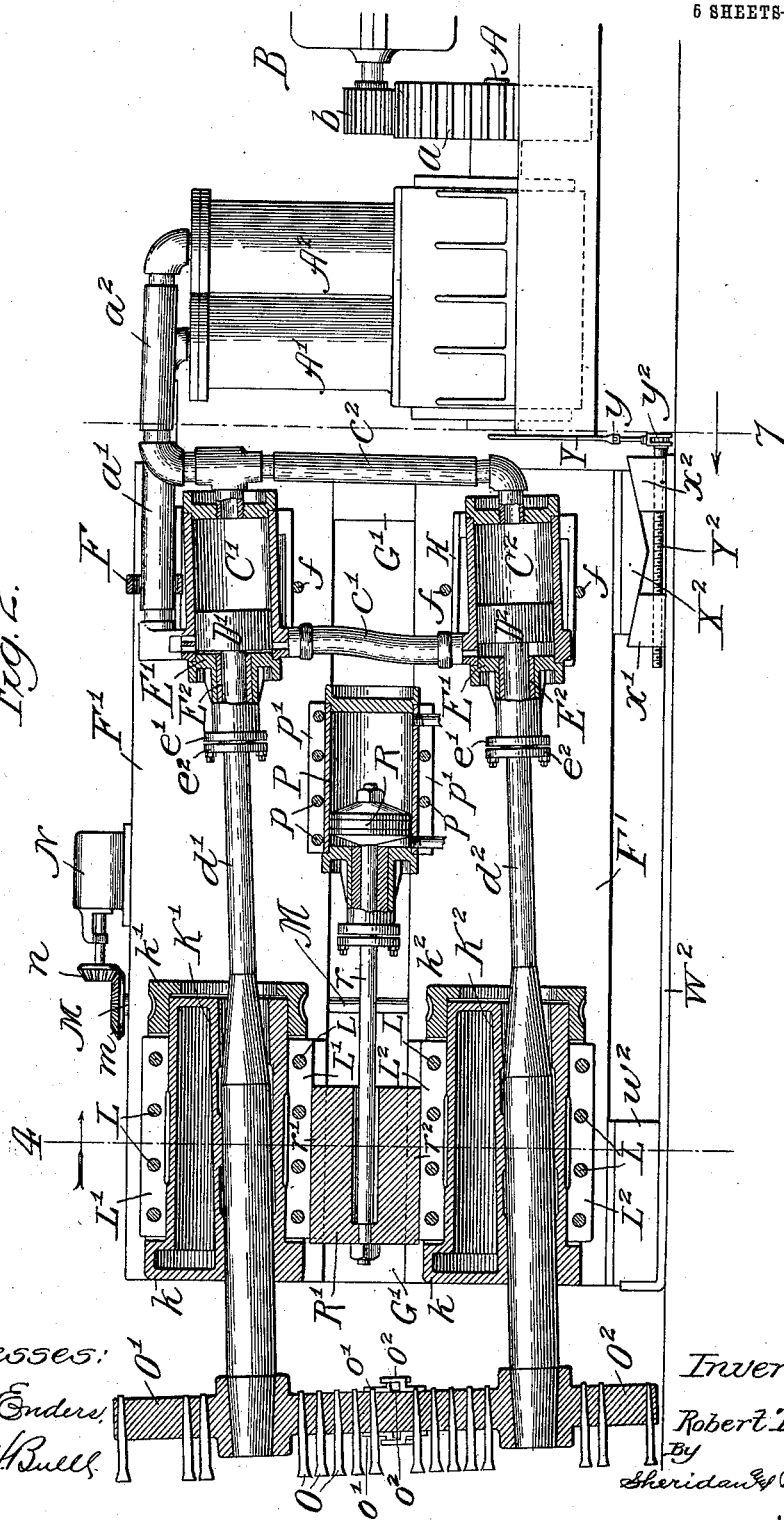

R. TEMPLE.
ROCK CUTTING APPARATUS.
APPLICATION FILED SEPT. 16, 1907.

1,001,903.

Patented Aug. 29, 1911.
5 SHEETS—SHEET 3.

Witnesses:
John Enders.
Chas. H. Buell.

Inventor:
Robert Temple,
By Sheridan & Wilkinson
Attys.

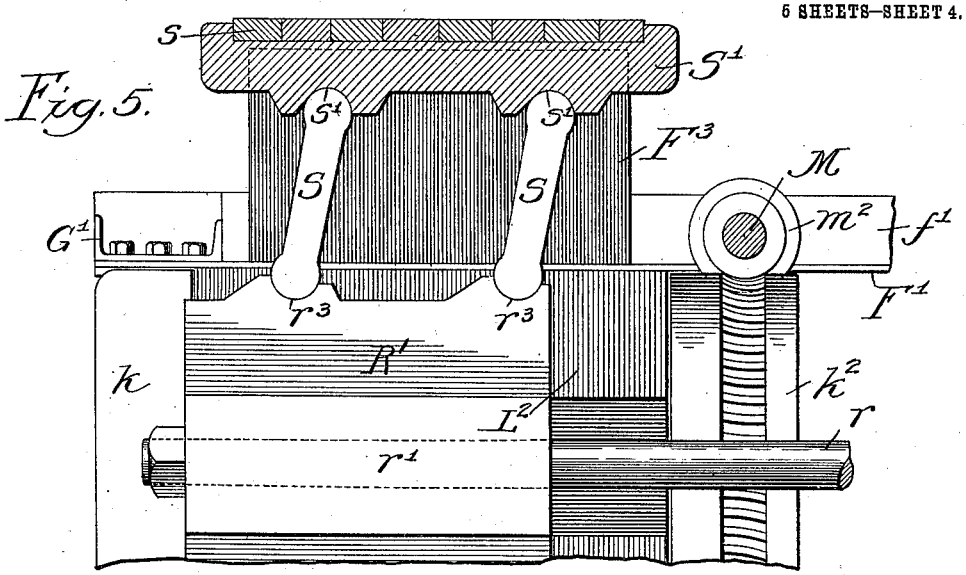
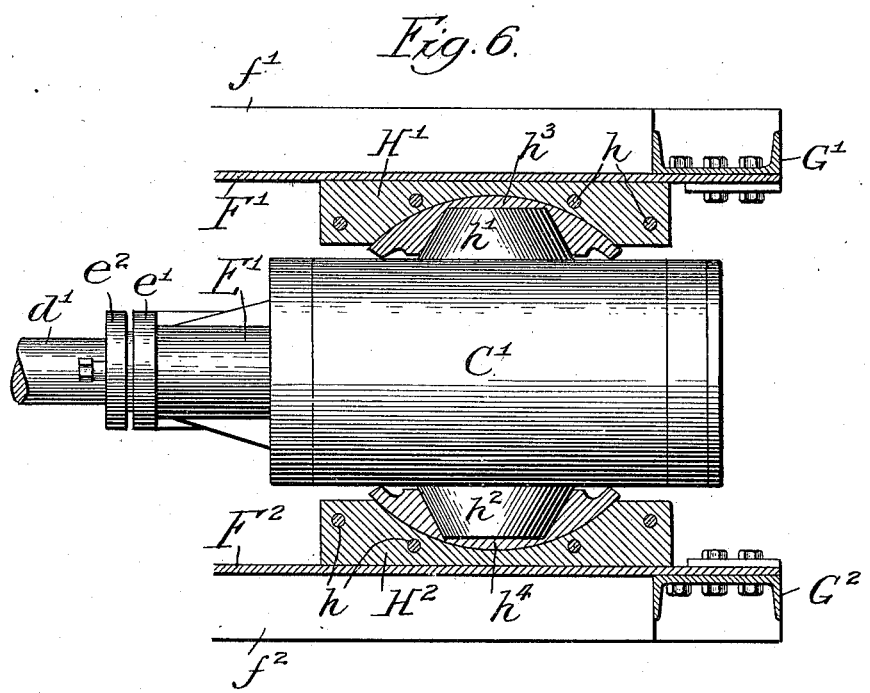

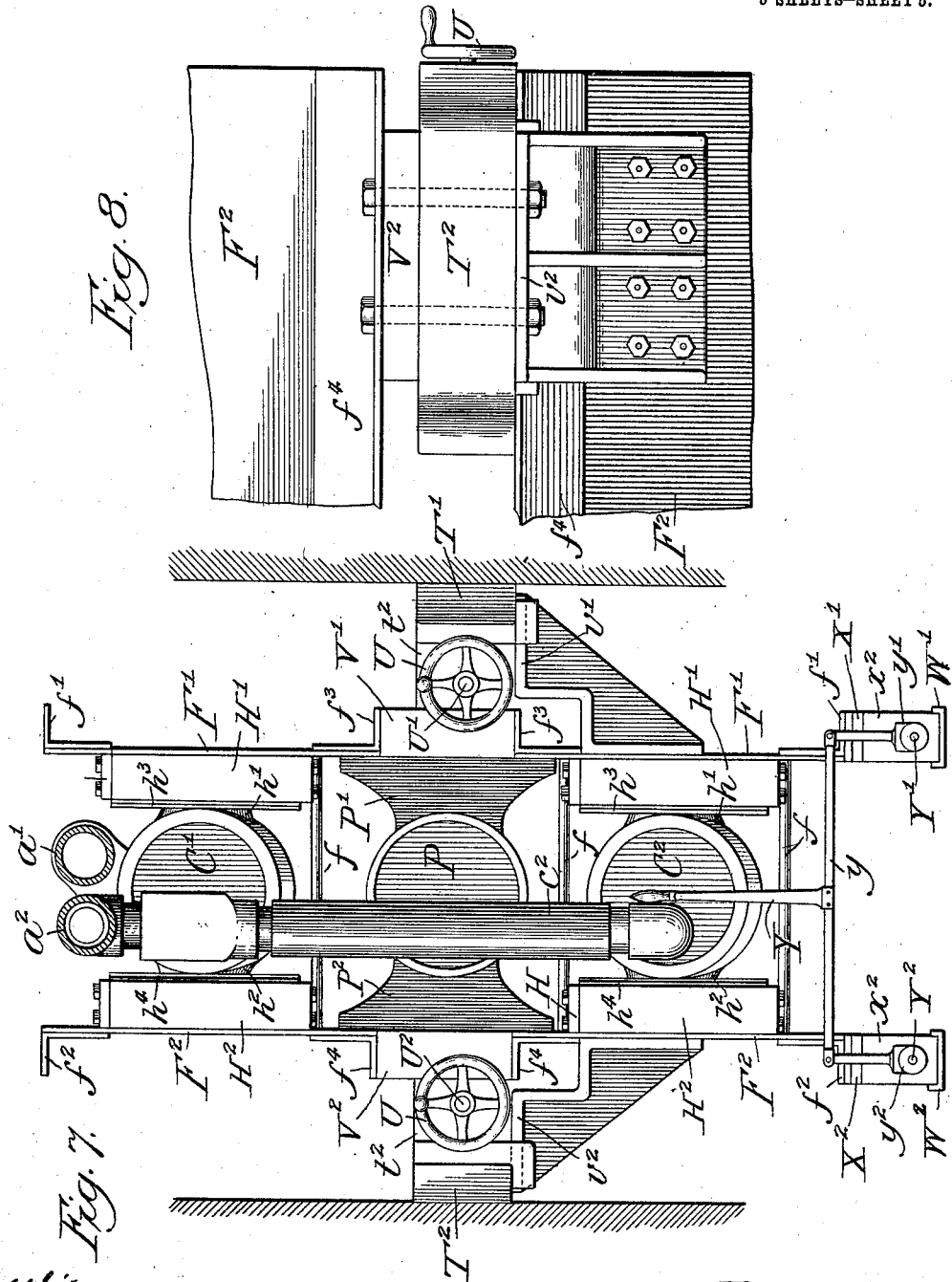

UNITED STATES PATENT OFFICE.

ROBERT TEMPLE, OF DENVER, COLORADO, ASSIGNOR TO THE TEMPLE ENGINEERING COMPANY, OF DENVER, COLORADO, A CORPORATION OF COLORADO.

ROCK-CUTTING APPARATUS.

1,001,903. Specification of Letters Patent. Patented Aug. 29, 1911.

Application filed September 16, 1907. Serial No. 393,212.

*To all whom it may concern:*

Be it known that I, ROBERT TEMPLE, a citizen of the United States, residing in the city and county of Denver, in the State of Colorado, have invented certain new and useful Improvements in Rock-Cutting Apparatus, of which the following is a specification.

My invention relates in general to rock-cutting apparatus, and more particularly to a machine for cutting tunnels through rock or other materials.

The primary object of my invention is to provide a machine for cutting tunnels through rock or other materials, the cutter of which will be reciprocated and simultaneously moved transversely to its direction of reciprocation, thereby cutting a tunnel of greater cross section than the machine.

A further object of my invention is to provide a machine for automatically cutting away rock or other material to form a tunnel of a desired cross section and which will be automatically moved forward as the work progresses.

A still further object of my invention is to provide a fluid pressure actuated machine for cutting tunnels through rock, which will move forwardly as the tunnel is cut and may be supplied with power through impulses of air transmitted from a stationary generator located at any desired point.

A final object of my invention is to provide a rock-cutting apparatus which will be comparatively simple in construction, practical in operation, and efficient in use.

The embodiment of my invention herein disclosed may be generally described as consisting of a pair of oscillatory motor cylinders, the pistons in which are reciprocated in unison by impulses of air supplied to the opposite sides thereof, rotating cylindrical guides through which the piston rods eccentrically extend, cutter heads carried by the ends of the piston rods, a movable supporting frame upon which the motor cylinders and guides are mounted, a cylinder fixed upon the frame having a piston therein, the rod of which is connected to shoes projecting laterally beyond the sides of the frame and adapted to be forced into contact with the side walls of the tunnel, thereby serving as an anchor relatively to which the apparatus is moved forwardly by the movement of the piston within the cylinder, and means for varying the lateral and vertical movement of the apparatus and thereby imparting the desired direction to the tunnel.

My invention will be more fully hereinafter described with reference to the accompanying drawings, in which the same is illustrated as embodied in convenient and practical form, and in which—

Figure 4:
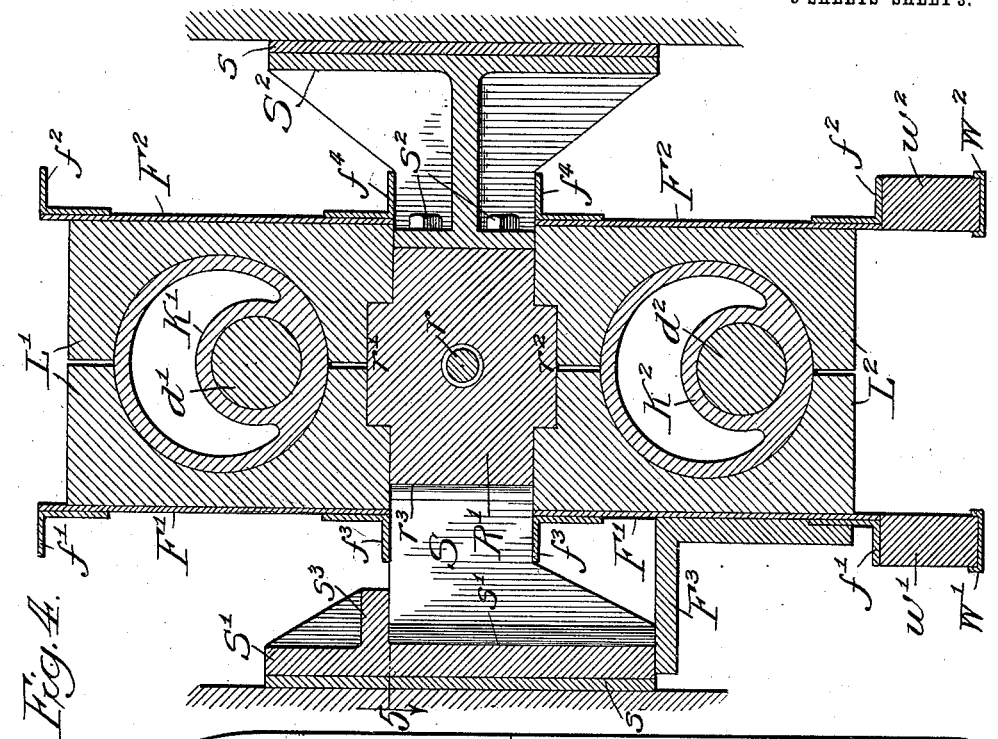
Figure 3:
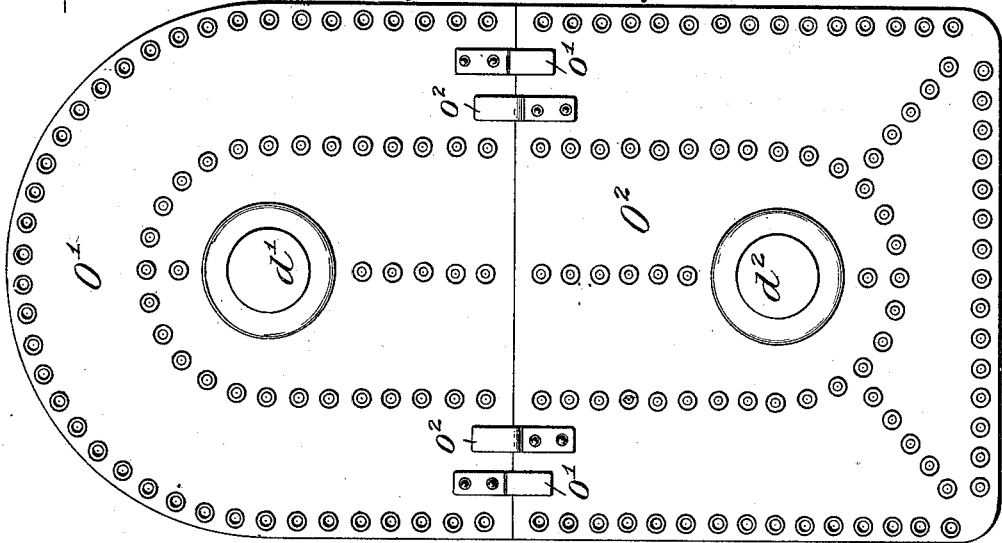

Figure 1 is a plan view; Fig. 2 an enlarged central vertical section, parts being shown in elevation; Fig. 3 an enlarged end elevation of the cutter heads; Fig. 4 an enlarged sectional view taken on line 4 of Fig. 2; Fig. 5 an enlarged detail sectional view taken on line 5 of Fig. 4; Fig. 6 an enlarged detail view showing one of the motor cylinders in plan and its supporting means in section; Fig. 7 is an enlarged end elevational view of the apparatus, taken on line 7 of Fig. 2; and Fig. 8 is an enlarged detail side elevation showing one of the side shoes and adjacent parts.

The same reference characters are used to designate the same parts in the several figures of the drawings.

Reference characters $A'$ $A^2$ indicate the cylinders of an air impulse generator or pulsator, while reference letter A indicates the shaft for driving the pistons within the cylinders $A'$ and $A^2$.

$a$ designates a gear wheel fixed upon the shaft A, with which meshes a pinion $b$ rotated by the motor B.

An air impulse generator, such as that above described and illustrated in the drawings, does not in itself constitute my present invention. It is, therefore, unnecessary in this case to illustrate or describe in detail the construction and operation of the air impulse generator.

Reference characters $C'$ and $C^2$ designate motor cylinders having reciprocating pistons $D'$ and $D^2$ therein. A conduit $a^2$ extends from one of the cylinders $A^2$ of the impulse generator to one end of the motor cylinder $C'$, while a branch conduit $c^2$ connects the conduit $a^2$ with the corresponding end of the motor cylinder $C^2$. A conduit $a'$ extends from the cylinder $A'$ of the pulsator to the opposite end of the motor cylinder $C'$; while a branch conduit $c'$ leads from such end of the cylinder $C'$ to the corresponding end of the other motor cylinder $C^2$. The operation of the impulse generator consequently reciprocates the pistons D′ and D² in unison within the corresponding motor cylinders.

The piston rods $d'$ and $d^2$ are reciprocated by the pistons within the motor cylinders, such piston rods extending through and being suitably guided by the cylinder ends E′. The forward end E′ of each of the cylinders is provided with a tubular extension surrounding the corresponding piston rod and within which extends a sleeve E² interposed between the piston rod and the tubular extension of the cylinder head. Each of the sleeves E² is provided with a flange $e^2$ at its outer end, which overlies and is secured to a corresponding flange $e'$ carried by the tubular extension of the cylinder head.

The motor cylinders C′ and C² are supported between the side frames of a suitable structure for supporting the apparatus. The supporting structure is shown as comprising sheet metal side plates F′ and F², each of such plates being formed in two sections separated by a horizontally extending space, as clearly indicated in Fig. 2. In order to impart the requisite structural strength to the side plates, angle irons $f'$ and $f^2$ are secured along the upper and lower edges thereof, while similar angle bars $f^3$ and $f^4$ are secured along the side plates above and below the spaces between the sections thereof, as will be clearly seen from an inspection of Fig. 4. Vertical channel bars G′ and G² are secured to the ends of the side plates on the outer surfaces thereof.

Each of the motor cylinders is provided with a pair of trunnions $h'$ and $h^2$, as shown in Fig. 6. These trunnions project within journal bearings $h^3$ and $h^4$ and are adapted to permit a vertical oscillation of the cylinder. The journal bearings $h^3$ and $h^4$ are provided with spherical outer surfaces, which engage with spherical concave seats formed within blocks H′, H² rigidly secured to the inner surface of the side plates F′ and F² by any suitable means, as, for instance, bolts $h$, extending through such blocks and into engagement with angle plates H projecting inwardly from the side plates.

The piston rods $d'$ and $d^2$ extend eccentrically through rotary cylindrical guides K′ and K². The cylindrical guides are provided with worm wheels $k'$ $k^2$ around corresponding ends, while their other ends are provided with radial flanges $k$. The guide K′ is rotatably supported between a pair of blocks L′, rigidly secured between the side plates F′ and F² by bolts L. The inner surfaces of the pair of blocks are cylindrically concaved, so as to surround the guide K′ and lie within the flange $k$ and the worm wheel $k'$, thereby preventing longitudinal movement of the guide with respect to the blocks but permitting the guide to be freely rotated between the blocks. A similar pair of blocks L² surrounds the lower cylindrical guide K², such blocks being also rigidly secured between the side plates by means of transverse bolts L. The blocks L² surround the guide K² and extend between the flange $k$ on the one end thereof and the worm wheel $k^2$ fixed upon the other end thereof.

In order that the cylindrical guides K′ and K² may be rotated, a shaft M is journaled upon one of the side plates and is provided with worms meshing with the worm wheels $k'$ and $k^2$, one of such worms upon the shaft M being shown at $m^2$ in Fig. 2. The shaft M may be rotated in any suitable manner, as by means of a bevel gear $m$ fixed thereon, which meshes with a bevel gear $n$ rotated by a motor N. This motor may be conveniently mounted upon the upper angle bar $f'$ of the side plate F′, as shown in Fig. 2.

The ends of the piston rods $d'$ $d^2$, which project through the cylindrical guides, have fixed thereon cutter heads O′ and O², such cutter heads being provided with holes, into which extend the shanks of cutters O. The upper edge of the top cutter head O′ is preferably curved, while the lower edge of the bottom cutter head O² is straight, as shown in Fig. 3, thereby imparting to the tunnel which is cut by the apparatus an arched top and flat bottom wall. In order that the cutter heads may move in unison, their adjacent edges are provided with overlapping brackets $o'$ and $o^2$, the brackets $o'$ being secured to the cutter head O′ and overlying the adjacent portion of the cutter head O², and the brackets $o^2$ being secured to the cutter head O² and overlying the adjacent portion of the cutter head O′. Such brackets are secured to both surfaces of the cutter heads, as shown in Fig. 2.

P designates a cylinder fixed to the supporting frame by means of webs P′ and P² extending from the cylinder in opposite directions to the inner surfaces of the side plates F′ and F² of the supporting structure. Transverse bolts $p$ extend above and below the cylinder P and project through holes in the flanges $p'$ and $p^2$ on the webs P′ and P² and through registering holes in the side plates F′ and F². The cylinder P is thereby rigidly secured to the supporting structure.

R indicates a piston located within the cylinder P and having a rod $r$ extending through suitable guides and a stuffing box projecting from one of the cylinder heads. Motive fluid may be supplied to either end of the cylinder by any suitable means, not shown.

The piston rod $r$ is secured to a carriage R′ lying between the pairs of blocks L′ and L². In order to guide the carriage between the blocks, longitudinal projections $r'$ and $r^2$ are provided thereon, which are received within correspondingly shaped channels in the adjacent surfaces of the pairs of blocks, as clearly shown in Fig. 4. A pair of toggle plates S are interposed between one side edge of the carriage R' and a side clamping shoe S', the inner vertical edges of the toggle plates being curved and fitting within curved vertical grooves $r^3$ in the carriage; while the outer vertical edges of the toggle plates are curved and fit within curved channels $s'$ formed in the inner surface of the shoe S'. A shoe $S^2$ is fixed to the carriage R' at the opposite side thereof by any suitable means, as, for instance, screws $s^2$. The portion of the shoe $S^2$ which is secured to the carriage is reduced in height and extends between the pair of angle plates $f^4$ $f^4$ along the edges of the two sections of the plate $F^2$.

The toggle plates S extend between the angle plates $f^3$ $f^3$ secured along the inner edges of the sections of the side plate F'. The lower edges of the toggle plates, as well as the lower edge of the shoe S', rests upon an angular bracket $F^3$ rigidly secured to the outer surface of the side plate F'. The shoe S' is provided with a horizontal flange $s^3$ which overlies and rests upon the toggle plates S. The outer surfaces of the side clamping shoes S' and $S^2$ are provided with any suitable material $s$ for engaging and gripping the side walls of the tunnel, thereby serving as an anchor with respect to which the apparatus may be moved forward.

In order that the movement of the apparatus may be guided laterally, shoes T' and $T^2$ are provided adjacent the rear end of the supporting structure, such shoes engaging and sliding upon the side walls of the tunnel. The guiding shoes T' and $T^2$ are adjustable laterally with respect to the supporting frame by any suitable means, such, for instance, as the arrangement of wedge blocks shown in the drawings. Each of the shoes T' and $T^2$ is provided with a wedge block T having converging inclined surfaces engaged by wedge blocks $t'$ and $t^2$. A screw-threaded shaft U' extends loosely through one of the wedge blocks, as, for instance, $t^2$, and engages a screw-threaded opening in the other wedge block $t'$,—a collar $u$ being fixed upon the shaft to prevent the wedge block $t^2$ from moving axially with respect to the shaft. A hand wheel U is fixed upon the shaft U', by means of which the shaft is rotated. A similar shaft $U^2$ is provided for moving the wedge blocks which actuate the shoe $T^2$, as shown in Fig. 1. The pairs of wedge blocks $t'$ and $t^2$ are supported upon brackets $v'$ and $v^2$ projecting from the lower sections of the side plates F' and $F^2$, as shown in Fig. 7. The shoes T' and $T^2$ also rest upon such brackets $v'$ and $v^2$. The inner surfaces of the pairs of wedge blocks rest against supports V' and $V^2$ secured between the pairs of angle plates $f^3$ and $f^4$ on the inner edges of the sections of the side plates of the supporting frame.

In order that the movement of the apparatus may be directed upwardly or downwardly, mechanism is provided for raising or lowering the rear end of the supporting frame, thereby imparting to the tunnel a downward or upward direction as desired. Runners W' and $W^2$ are located beneath the bottom angle bars $f'$ and $f^2$ of the side plates of the supporting frame, upon which the apparatus is supported. Blocks $w'$ and $w^2$ are interposed between the forward ends of the runners and the forward ends of the supporting plates, while the supporting blocks beneath the rear ends of the supporting plates and the underlying runners are vertically adjustable by means of pairs of wedge blocks. Wedge blocks X' and $X^2$, each having downwardly converging surfaces, are secured beneath the angle bars $f'$ and $f^2$ at the rear end of the supporting structure, and beneath each of such wedge blocks is a pair of wedge blocks $x'$ and $x^2$, through which extend right and left screw-threaded shafts Y' and $Y^2$. The screw-threaded shafts have mounted upon their ends ratchet mechanism $y'$ and $y^2$, such ratchet mechanism being connected by a link $y$ adapted to be reciprocated by a hand lever Y. It is obvious that by reciprocating the hand lever, the reversely screw-threaded shafts Y' and $Y^2$ may be rotated in unison in either direction and the wedge blocks $x'$ and $x^2$ in each pair thereby moved toward or away from each other.

In order that the side plates of the supporting frame may be rigidly united, transverse bolts $f$ extend above and below the motor cylinders. The upper transverse bolt is preferably formed as a guide F, through which the conduit $a'$ extends, as clearly shown in Figs. 1 and 2.

The operation of my improved apparatus is as follows: The air impulse generator is located at any convenient point and put into operation, thereby transmitting through the conduits $a'$ and $a^2$ impulses of air to the opposite ends of the motor cylinders C' and $C^2$. It is obvious that the conduits $a'$ and $a^2$ may be flexible and of any desired length, so that the pulsator may be stationary while the rock-cutting apparatus moves forward as the work progresses. The motor N rotates the shaft M, which, in turn, through the meshed worms and worm wheels, rotates the cylindrical guides K' and $K^2$. The piston rods $d'$ and $d^2$ are therefore reciprocated in unison by the air impulses, and simultaneously move through circular transverse paths, owing to their extending eccentrically through the rotary cylindrical guides. The cutter heads carried by the piston rods are consequently reciprocated and coincidentally move transversely, so as to engage the surface of rock in advance of the apparatus and cut away in pieces the rock, thereby forming a tunnel of a cross section corresponding to the transverse path of movement of the cutter heads.

When the tunnel has been cut far enough so that the clamping shoes $S'$ and $S^2$ extend within the side walls thereof, motive fluid is admitted to the piston P at the right of the piston, thereby moving the piston toward the left. Such movement of the piston moves the carriage $R'$ forwardly, and with it the clamping shoes $S'$ and $S^2$. The supply of motive fluid to the right end of the cylinder P is then discontinued and the left side of the piston then exposed to motive fluid. The motive fluid tends to move the piston R toward the right, thereby through the toggle plates S and carriage $R'$ forcing the shoe $S'$ outwardly against the adjacent surface of the tunnel. The outward movement of the shoe $S'$ forces the apparatus in an opposite direction until the shoe $S^2$ grips the opposite surface of the tunnel. The shoes $S'$ and $S^2$ thereby serve as an anchor, so that the fluid pressure between the piston R and left head of the cylinder moves the apparatus forwardly with respect to the shoes, thereby advancing the cutters as the rock is cut away. When the apparatus has been advanced relatively to the clamping shoes the distance permitted by the travel of the piston R within the cylinder P, the fluid pressure is exhausted from the left end of the cylinder and again admitted to the right end, thereby advancing the carriage and with it the clamping shoes in position to grip the side walls of the tunnel at advanced points. A further pressure is then again admitted to the left end of the cylinder, when the apparatus will be automatically advanced a distance corresponding to the travel of the piston.

When it is desired to direct the work toward the left, the pair of wedge blocks which engage the guide shoe $T'$ are separated by rotating the shaft $U'$, while the pair of wedge blocks which engage the opposite side shoe $T^2$ are moved toward each other by rotating the shaft $U^2$. This operation moves the rear end of the supporting structure toward the right, and consequently directs the cutting heads toward the left. A reverse manipulation of the wedge blocks of the side shoes results in the cutter heads being directed toward the right.

When it is desired that the tunnel should be directed upwardly, the wedge blocks $x'$ and $x^2$ in the pairs are separated by rotating the reversely screw-threaded shafts $Y'$ and $Y^2$, thereby permitting the rear end of the apparatus to be lowered, and consequently elevating the cutter heads. In order to direct the cutting operation downwardly, the wedge blocks $x'$ and $x^2$ in the two pairs thereof are moved together, thereby elevating the rear end of the apparatus.

From the foregoing description it will be observed that I have invented an improved rock-cutting apparatus, by means of which a tunnel may be cut of uniform cross section and having any vertical or lateral direction desired. It will be further observed that my improved apparatus automatically moves forward as the work of cutting a tunnel progresses, while the pulsator, from which the power is derived, may remain stationary at any desired point, or may be carried forward with the cutter. It is further evident that by my improvement the cutter head is reciprocated and simultaneously moved in a transverse path, thereby cutting a tunnel of a cross section greater than the area of the cutting head, but equal to the transverse path of movement of the cutter head, a space being consequently formed around the cutting apparatus to allow the stone cuttings to be removed by a screw or suitable machinery.

It will be observed that the transverse movement imparted to the rods which carry the cutter heads, causes the cutter heads to move relatively to the surface worked upon in a substantially spherical path. A great advantage results from this motion, in that the cutter heads are brought in contact with the breast of the tunnel in such a direction as to avoid cutting a sharp angle, thereby facilitating the moving of the rock and insuring the gage being maintained.

It will be seen that in a general way the reciprocating rods $d'$ and $d^2$ describe circular conical surfaces as their paths, thus imparting a circular sweep to the cutter head $O'$.

What I regard as new and desire to secure by Letters Patent is:—

1. In a rock-cutting apparatus, the combination with a transversely extending head, of a plurality of cutters mounted thereon, means for reciprocating said head, and means for simultaneously moving the same in complete cycles over a substantially circular path adjacent the surface worked upon and eccentric to the said head.

2. In a rock-cutting apparatus, the combination with a cutter head, of a plurality of scattered cutters carried by said head, means for reciprocating said cutter head, and means independent of said reciprocating means for simultaneously bodily moving said cutter head in a circular path contained in a plane lying transversely to the direction of its reciprocation.

3. In a rock-cutting apparatus, the combination with a transversely extending head, of a plurality of cutters mounted thereon, a rod upon which said head is carried, means for reciprocating said rod, and means for simultaneously moving said rod in a path lying in a plane transverse to the direction of its reciprocation.

4. In a rock-cutting apparatus, the combination with a cutter, of a cylinder supported on a universal pivot and having a conical path of movement, the center of said pivot being at the apex of said conical path, a reciprocating piston in said cylinder, a piston rod upon which said cutter is mounted, and means for moving said cylinder in said path to impart to said cutter a movement relatively to the surface worked upon in a circular path, the radii of which converge at the axis of movement of said cylinder.

5. In a rock-cutting apparatus, the combination with a cutter, of a cylinder pivoted to oscillate freely within a limited range in any direction, a reciprocating piston in said cylinder, a piston rod upon which said cutter is mounted, a rotating guide through which said rod eccentrically extends and automatic means to continuously operate said guide.

6. In a rock-cutting apparatus, the combination with a pair of cutter heads, of a pair of parallel rods upon which said cutter heads are mounted, means for reciprocating said rods in unison, and means for simultaneously and continuously moving said rods in conical paths said motion being transverse to the direction of their reciprocation.

7. In a rock-cutting apparatus, the combination with a pair of cutter heads, of a pair of cylinders, reciprocating pistons in said cylinders, piston rods upon which said cutter heads are mounted, and a pair of rotary guides through which said rods eccentrically extend, whereby said cutter heads are moved in a path transverse to the direction of their reciprocation.

8. In a rock-cutting apparatus, the combination with a movable supporting frame, of a reciprocating cutter mounted upon said frame, means for giving said cutter a transverse movement, means for reciprocating said cutter also mounted upon said frame, and frame-moving means comprising an anchoring shoe element, a reciprocatory carriage, a cylinder and piston coacting together, one element of which is fixed to said frame and the other to the said carriage, and a toggle element coacting between the said shoe and carriage, said frame-moving means automatically moving said frame forwardly simultaneously with the advance of the cutting work.

9. In a rock-cutting apparatus, the combination with a cutter of an oscillatory cylinder, a movable supporting frame upon which said cylinder is mounted, a reciprocating piston in said cylinder, a piston rod upon which said cutter is carried, means for oscillating said cylinder and thereby imparting to said cutter a movement transverse to its direction of reciprocation, and means for automatically moving said frame forwardly as the work of cutting progresses.

10. In a rock-cutting apparatus, the combination with a cutter of an oscillatory cylinder, a movable supporting frame upon which said cylinder is mounted, a reciprocating piston in said cylinder, a piston rod upon which said cutter is carried, means for oscillating said cylinder and thereby imparting to said cutter a movement transverse to its direction of reciprocation, means for automatically moving said frame forwardly as the work of cutting progresses, and means for varying the direction of the forward movement of said frame.

11. In a rock-cutting apparatus, the combination with a movable supporting frame, of an oscillatory cylinder mounted upon said frame, a reciprocating piston in said cylinder, a piston rod, a cutter carried by said rod, a rotary guide mounted upon said frame through which said rod eccentrically extends, means for rotating said guide and means for automatically moving said frame forwardly as the work of cutting progresses.

12. In a rock-cutting apparatus, the combination with a movable supporting frame, of an oscillatory cylinder mounted upon said frame, a reciprocating piston in said cylinder, a piston rod, a cutter carried by said rod, a rotary guide mounted upon said frame through which said rod eccentrically extends, means for rotating said guide, means for automatically moving said frame forwardly as the work of cutting progresses, means for guiding said frame laterally during its forward movement, and means for guiding said frame vertically.

13. In a rock-cutting apparatus, the combination with a movable supporting frame, of a cutter mounted upon said frame, means for actuating said cutter also mounted upon said frame, a cylinder secured to said frame, a piston within said cylinder, shoes projecting laterally beyond the sides of said frame, and means for connecting said shoes with said rod, whereby they are forced outwardly into contact with adjacent stationary surfaces.

14. In a rock-cutting apparatus, the combination with a movable supporting frame, of a cutter mounted upon said frame, means for actuating said cutter also mounted upon said frame, a cylinder carried by said frame, a reciprocating piston within said cylinder, a carriage operatively connected to said piston and movable longitudinally thereby with respect to said frame, and shoes operated by said carriage and projecting laterally beyond the sides of said frame.

15. In a rock-cutting apparatus, the combination with a movable frame, of a cutter mounted upon said frame, means for actuating said cutter also mounted upon said frame, means for moving said frame forwardly as the work of cutting progresses, guiding shoes carried by and projecting from the opposite sides of said frame, and means for adjusting said guiding shoes laterally with respect to said frame.

16. In a rock-cutting apparatus, the combination with a movable supporting frame, of a reciprocating cutter mounted upon the front end of said frame, means for reciprocating said cutter also mounted upon said frame, means engaging adjacent fixed surfaces for moving said frame forwardly as the work of cutting progresses, runners located beneath said frame adapted to move over the supporting surface, and means interposed between said frame and its supporting runners for vertically adjusting the frame relatively to said runners.

17. In a rock-cutting apparatus, the combination with a movable supporting frame, of a cutter mounted upon said frame, means for actuating said cutter also mounted upon said frame, means for moving said frame forwardly as the work progresses, guiding shoes projecting laterally from the opposite sides of said frame and adapted to engage adjacent fixed surfaces, means for laterally adjusting said guiding shoes with respect to said frame, a pair of runners adapted to move relatively to a supporting surface and upon which said frame is mounted, and means interposed between said frame and said runners for vertically adjusting said frame with respect to said runners.

18. In a rock-cutting apparatus, the combination with a movable supporting frame, of a cutter mounted upon said frame, means for actuating said cutter also mounted upon said frame, anchoring means movably carried by said frame for securely engaging fixed surfaces on the opposite sides thereof, means for moving said frame relatively to said anchoring means, and means engaging adjacent fixed surfaces for guiding said frame during its forward movement relatively to said anchoring means.

19. In a rock-cutting apparatus, the combination with a movable supporting frame, of an oscillatory cylinder mounted upon said frame, a reciprocating piston within said cylinder, a piston rod, a cutter carried by said piston rod, a rotary guide carried by said frame through which said rod eccentrically extends, anchoring means carried by said frame and adapted to securely engage fixed surfaces adjacent said frame, means for moving said frame relatively to said anchoring means, and means for guiding said frame during its forward movement relatively to said anchoring means.

20. In a rock-cutting apparatus, the combination with a movable supporting frame, of a pair of oscillatory cylinders mounted upon said frame, reciprocating pistons within said cylinders, means for reciprocating said pistons in unison, piston rods connected to said pistons, cutter heads carried by said piston rods, cylindrical guides through which said rods eccentrically extend, and means for rotating said cylindrical guides in unison and thereby imparting to said cutter heads a path of movement transverse to the direction of their reciprocation.

21. In a rock-cutting apparatus, the combination with a movable supporting frame, of a pair of oscillatory cylinders mounted upon said frame, reciprocating pistons within said cylinders, means for reciprocating said pistons in unison, piston rods connected to said pistons, cutter heads carried by said piston rods, cylindrical guides through which said rods eccentrically extend, means for rotating said cylindrical guides in unison and thereby imparting to said cutter heads a path of movement transverse to the direction of their reciprocation, and means for automatically moving said frame forwardly as the work of cutting progresses.

22. In a rock-cutting apparatus, the combination with a movable supporting frame, of a pair of oscillatory cylinders mounted upon said frame, reciprocating pistons within said cylinders, means for reciprocating said pistons in unison, piston rods connected to said pistons, cutter heads carried by said piston rods, cylindrical guides through which said rods eccentrically extend, means for rotating said cylindrical guides in unison and thereby imparting to said cutter heads a path of movement transverse to the direction of their reciprocation, means for automatically moving said frame forwardly as the work of cutting progresses, and means for guiding said frame during its forward movement.

23. In a rock-cutting apparatus, the combination with a movable supporting frame, of a pair of oscillatory cylinders mounted upon said frame, reciprocating pistons within said cylinders, means for reciprocating said pistons in unison, piston rods connected to said pistons, cutter heads carried by said piston rods, cylindrical guides through which said rods eccentrically extend, means for rotating said cylindrical guides in unison and thereby imparting to said cutter heads a path of movement transverse to the direction of their reciprocation, means for automatically moving said frame forwardly as the work of cutting progresses, guiding shoes carried by and projecting from the sides of said frame and adapted to engage adjacent stationary surfaces, means for adjusting said shoes laterally with respect to said frame, and means for vertically guiding said frame during its forward movement.

24. In a rock-cutting apparatus, the combination with a movable supporting frame, of a pair of oscillatory cylinders mounted upon said frame, reciprocating pistons within said cylinders, means for reciprocating said pistons in unison, piston rods connected to said pistons, cutter heads carried by said piston rods, cylindrical guides through which said rods eccentrically extend, means for rotating said cylindrical guides in unison and thereby imparting to said cutter heads a path of movement transverse to the direction of their reciprocation, means for automatically moving said frame forwardly as the work of cutting progresses, guiding shoes carried by and projecting from the sides of said frame and adapted to engage adjacent stationary surfaces, means for adjusting said shoes laterally with respect to said frame, runners upon which said frame is supported and which are adapted to move over a supporting surface, and means interposed between said frame and said runners for vertically adjusting the frame relatively to the runners.

25. In a rock-cutting apparatus, the combination with a pair of cutter heads, of a pair of rods upon which said cutter heads are mounted, means for reciprocating said rods in unison, means for imparting to said rods conical paths of movement during their reciprocations, and means for connecting said heads to permit slight relative lateral movement.

26. In a rock-cutting apparatus, the combination with a transversely extending head, of a plurality of cutters mounted thereon, a rod upon which said head is carried, means for reciprocating said rod, and means comprising a rotating guide for moving said rod in a conical path during its reciprocation, and thereby correspondingly moving said head in a circular path without rotating it on its own axis.

27. In a rock-cutting apparatus, the combination with a pair of cutter heads, of a pair of parallel rods upon which said cutter heads are mounted, means for reciprocating said rods in unison, and means for imparting to said rods separate and relatively eccentric conical paths of movement during their reciprocations.

28. In a rock-cutting apparatus, the combination with a cutter, of a cylinder, a reciprocating piston in said cylinder, a piston rod upon which said cutter is mounted, means for imparting to said piston rod a conical path of movement during its reciprocation, and means for supporting said cylinder to oscillate in vertical and horizontal planes.

ROBERT TEMPLE.

Witnesses:
FREDRIC JOHN PALMA,
BRUCE S. CRAMER.